(12) United States Patent
Miyamoto (10) Patent No.: US 7,527,297 B2
(45) Date of Patent: May 5, 2009

(54) STRADDLE TYPE-VEHICLE

(75) Inventor: Takehiro Miyamoto, Iwata (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 303 days.

(21) Appl. No.: 11/351,303

(22) Filed: Feb. 9, 2006

(65) Prior Publication Data

US 2006/0261590 A1   Nov. 23, 2006

(30) Foreign Application Priority Data

May 11, 2005   (JP)   ............... 2005-139000

(51) Int. Cl.
  *B62J 6/00* (2006.01)
(52) U.S. Cl. ................... 280/835; 362/475
(58) Field of Classification Search ........... 280/835; 180/219; 362/473, 475, 476
See application file for complete search history.

(56) References Cited

U.S. PATENT DOCUMENTS

| | | | | |
|---|---|---|---|---|
| 4,379,584 A | * | 4/1983 | Willey | 296/78.1 |
| 4,515,405 A | * | 5/1985 | Ogishima | 296/78.1 |
| 4,519,472 A | * | 5/1985 | Kamiya | 180/227 |
| 4,618,020 A | * | 10/1986 | Noda et al. | 180/229 |
| 4,813,511 A | * | 3/1989 | Yamaguchi et al. | 180/219 |
| 6,428,192 B1 | * | 8/2002 | Chen | 362/474 |
| 6,802,632 B2 | * | 10/2004 | Kajitori et al. | 362/473 |

* cited by examiner

*Primary Examiner*—Kevin Hurley
(74) *Attorney, Agent, or Firm*—Hogan & Hartson LLP (57) ABSTRACT

A straddle-type vehicle that can reduce influence by air resistance without having a cowling has a handle bar for changing a direction of a front wheel, a headlight unit disposed in front of a handle bar base portion, and a fuel tank unit disposed behind the handle bar base portion for storing fuel supplied to an engine. A headlight line defined by a top surface of the headlight unit and a fuel tank line defined by a top surface of the fuel tank unit together extend along a fixed curved line in a side view of the motorcycle.

11 Claims, 10 Drawing Sheets

STRADDLE TYPE-VEHICLE

BACKGROUND OF THE INVENTION

1. Field of the Invention

This invention relates to a straddle-type vehicle that can reduce influence by air resistance without having a cowling.

2. Description of Related Art

Conventionally, a number of straddle-type vehicles such as motorcycles use a cowling for covering a portion of a vehicle body to reduce air resistance or wind noise caused by the vehicle traveling through air. On the other hand, because of requirements from viewpoints of design, other straddle-type vehicles (for example, the so-called American-type straddle-type vehicles) that do not have such a cowling are widely provided (see, for example Japanese Patent Document JP-A-2003-89371(Page 2 and FIG. 1).

In general, straddle-type vehicles that have no cowling, i.e. American-type motorcycles etc., do not have a large cowling, because their cruising speed is low in comparison with other kinds of straddle-type vehicles, in addition to the requirements from the viewpoints of design.

However, if no cowling is used, even an American-type motorcycle has the problem of wind noise caused by air resistance while the vehicle travels through the air, or influence of wind pressure on the rider occurs, when a running speed increases beyond a certain speed.

SUMMARY OF THE INVENTION

This invention is made under these circumstances, and an object thereof is to provide a straddle-type vehicle that can reduce influence by air resistance without having a cowling.

In order to solve the foregoing problem, one embodiment of this invention is a straddle-type vehicle including: a handle bar for changing a direction of a wheel; a headlight unit disposed in front of a handle bar base portion and positioned generally at a center portion of the handle bar; and a fuel tank unit disposed behind the handle bar base portion for storing fuel supplied to an engine. A headlight line defined by a top surface of the headlight unit extends generally parallel to the ground surface on which the straddle-type vehicle stands, in a side view of the straddle-type vehicle. The headlight line and a fuel tank line, defined by a top surface of the fuel tank unit, together extend along a fixed curved line or straight line in the side view of the straddle-type vehicle.

In accordance with this embodiment, the headlight line defined by the top surface of the headlight unit and the fuel tank line defined by the top surface of the fuel tank unit extend along the fixed curved line or straight line, specifically, a curved line (or straight line) that does not increase air resistance generated while the straddle-type vehicle runs. Thus, the wind noise caused by the air resistance while the vehicle going through the air or the influence of wind pressure on the rider can be reduced.

A straddle-type vehicle according to this invention can reduce influence by air resistance without having a cowling.

Another feature of this invention is a front fork having a pair of right and left front fork members for supporting the wheel, and a rear end portion of the headlight unit that enters a space defined by the pair of right and left front fork members.

Another feature of this invention is that the headlight line extends generally parallel to the ground surface (ground surface R) on which the straddle-type vehicle stands.

Another feature of this invention is a handle bar holder for holding the handle bar base portion. A handle bar holder line is defined by a top surface of the handle bar holder, and the headlight line, the handle bar holder line and the fuel tank line together extend along the fixed curved line or straight line in the side view of the straddle-type vehicle.

Another feature of this invention is a headlight stay attached to the top surface of the headlight unit for supporting the headlight unit. The headlight line is defined by a top surface of the headlight stay.

Another feature of this invention is a key inserted portion to which a key used when the straddle-type vehicle is operated is inserted, and a key covering portion for covering the key inserted portion.

Another feature of this invention is that the key covering portion covers or uncovers the key inserted portion by sliding in a fore to aft direction of the straddle-type vehicle.

Another feature of this invention is that the headlight stay further includes a rail portion extending in the fore to aft direction, and the key covering portion has a slide mechanism sliding along the rail portion.

Another feature of this invention is a handle bar crown to which the handle bar holder is fixed. A handle bar crown line defined by a top surface of the handle bar crown extends generally parallel to the ground surface on which the straddle-type vehicle stands, in the side view of the straddle-type vehicle.

Another feature of this invention is that the handle bar holder has a generally streamlined shape in a plan view of the straddle-type vehicle.

Another feature of this invention is that the headlight unit includes a lens portion and a body portion. A border between the lens portion and the body portion defines a lens border line, and a top portion of the lens border line is inclined forward relative to the straddle-type vehicle in the side view thereof.

According to the features of this invention, a straddle-type vehicle that reduces influence by air resistance is provided without having a cowling.

DETAILED DESCRIPTION OF THE INVENTION

Overall Outline of Structure of Straddle-type Vehicle According to This Embodiment With reference to the figures, an embodiment of the straddle-type vehicle according to this invention will be described. Additionally, in the descriptions of figures below, the same or similar portions are assigned with the same or similar reference numerals. However, it should be noted that the figures are schematic and ratios of respective sizes may be different from actual ratios.

Accordingly, specific sizes or the like should be determined in consideration of the following descriptions. Also, regarding respective relationships among the figures, the figures may include portions which have different dimensions or ratios from those of other portions in other figures.

Figure 1:
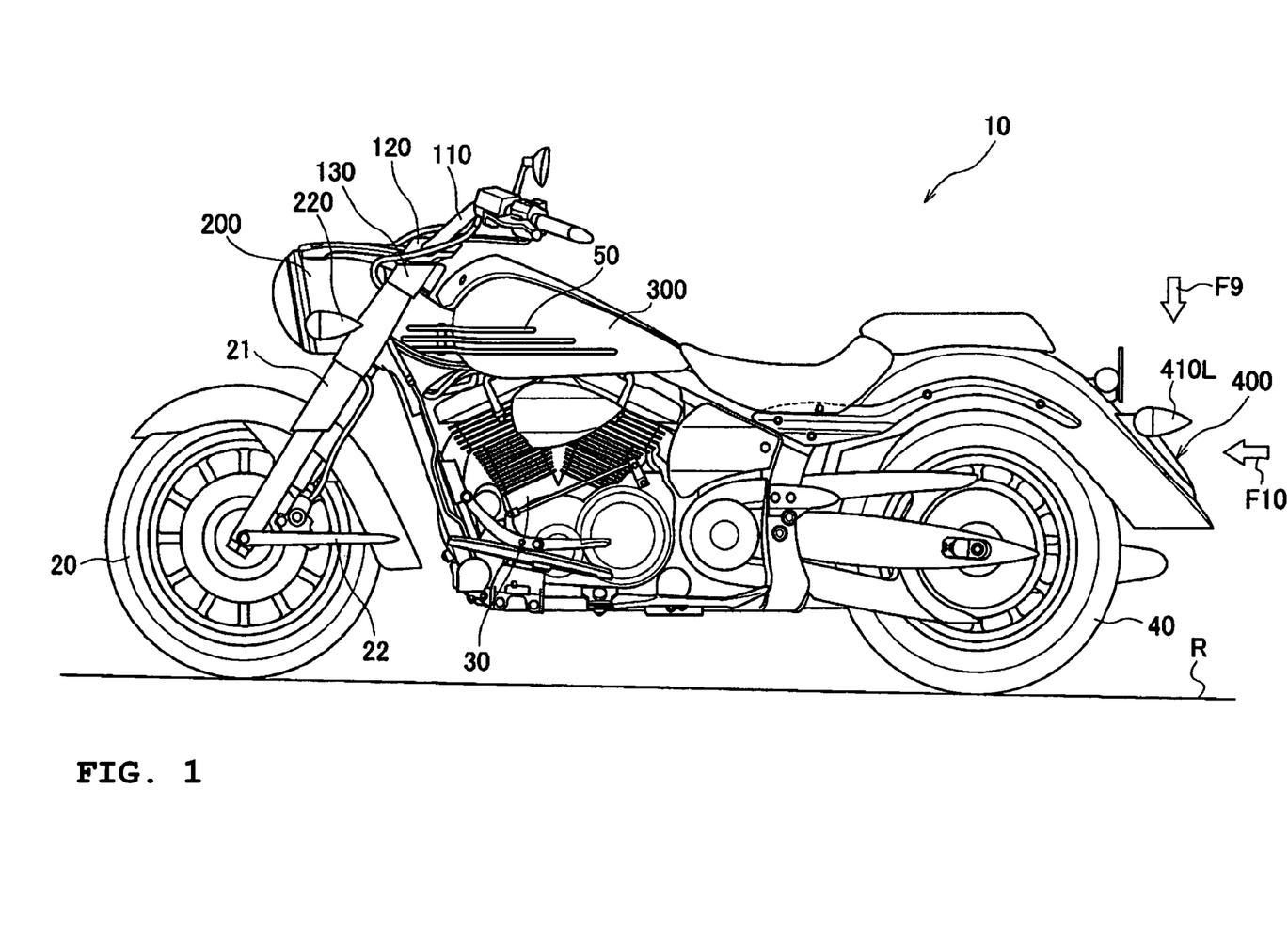
FIG. 1 is a left elevational view of a motorcycle according to an embodiment of this invention.

FIG. 1 is a left elevational view of a motorcycle 10 forming a straddle-type vehicle according to this embodiment. As shown in FIG. 1, the motorcycle 10 has a front wheel 20 and a rear wheel 40 and drives the rear wheel 40 using an engine 30.

A front fork 21 having a pair of right and left fork members supports the front wheel 20 for rotation. Respective top portions of the front fork 21 together have a handle bar crown 130 to which a handle bar holder 120 is fixed. The handle bar holder 120 holds a handle bar 110 for changing a direction of the front wheel 20.

A headlight unit 200 is disposed in front of the handle bar 110, and gives a light beam from a bulb (not shown) to the ground surface R or the like which exists in an advance direction of the motorcycle 10. Also, front turn signal lamps 220 are attached to the headlight unit 200.

A fuel tank unit 300 is disposed behind the handle bar 110, and stores fuel which is supplied to the engine 30.

Figure 9:
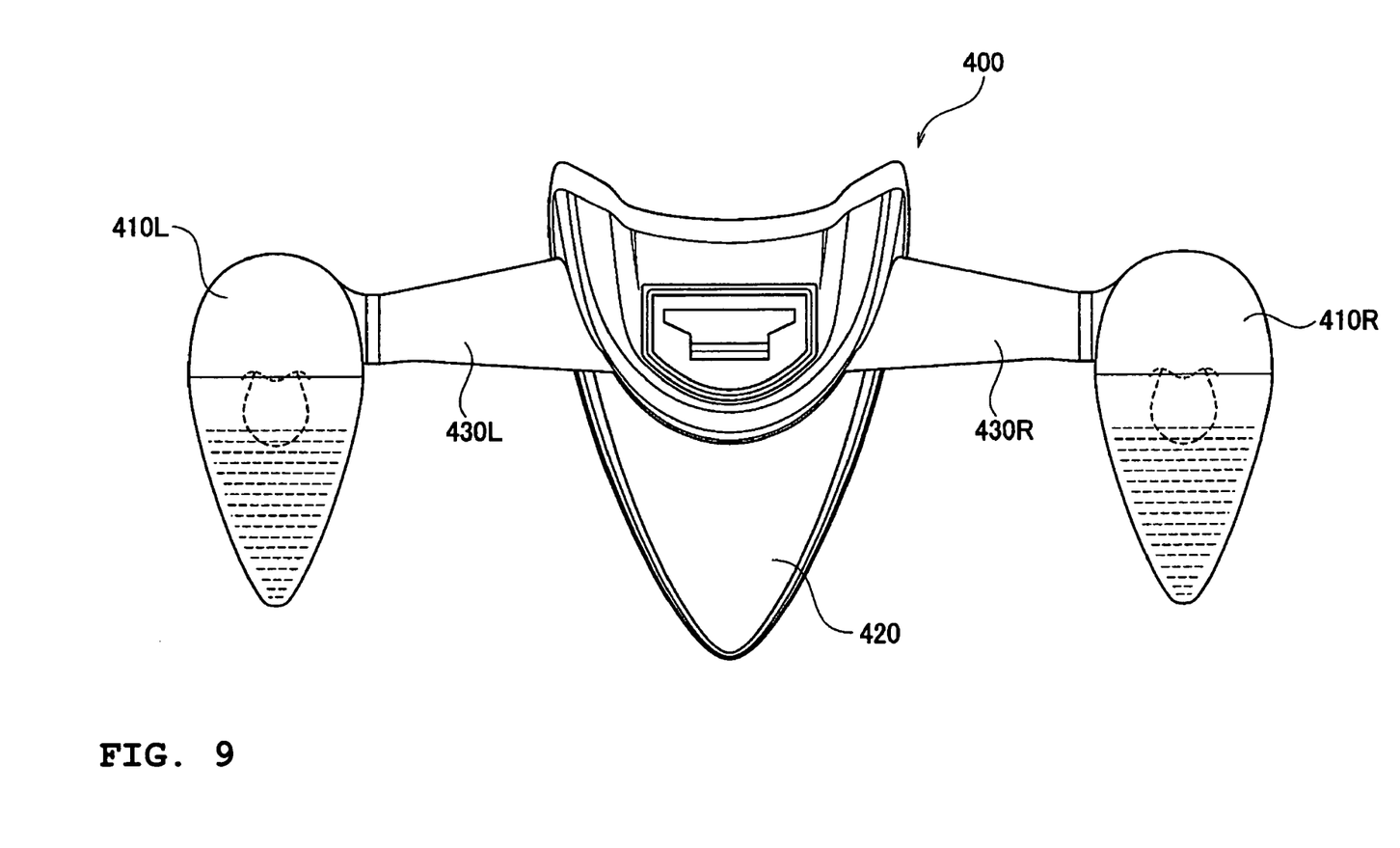
FIG. 9 is a view looked in the direction indicated by the arrow F9 of FIG. 1.
Figure 10:
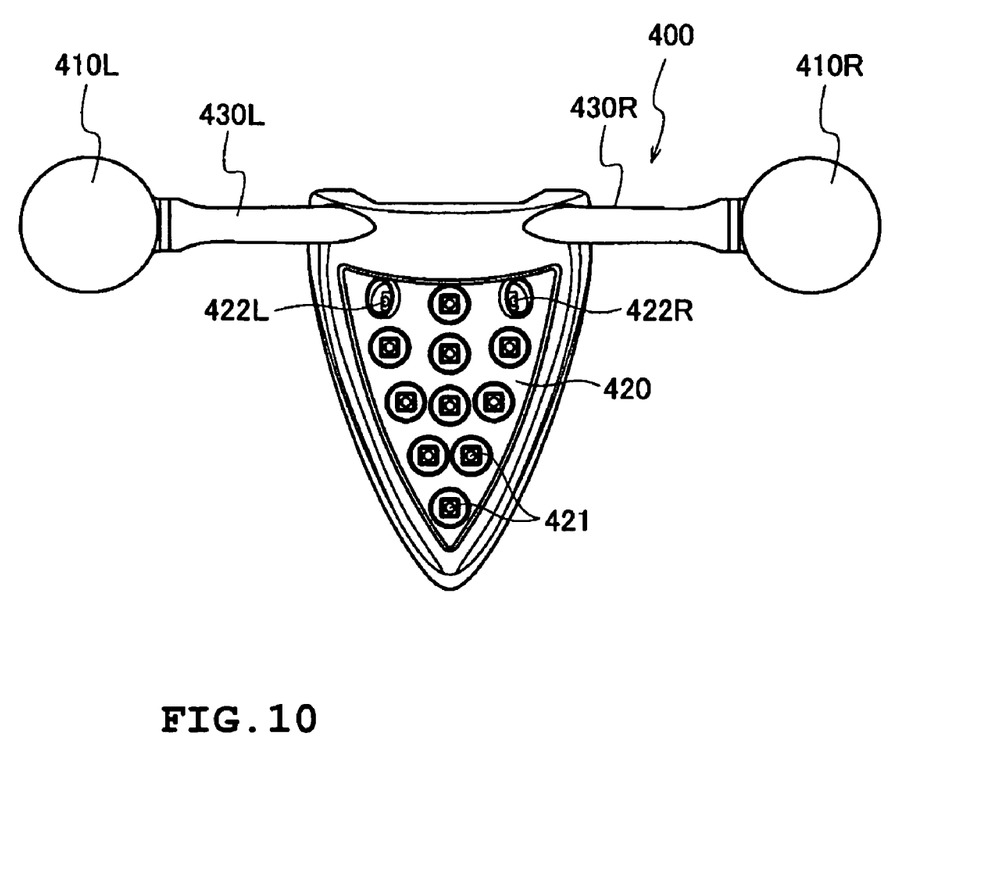
FIG. 10 is a view looked in the direction indicated by the arrow F10 of FIG. 1.

A tail light unit 400 is disposed at a rear portion of the motorcycle 10, and emits a red light to the rear side of the motorcycle 10 and in obliquely rear directions thereof using LED 421 (not shown in FIG. 1, see FIG. 10). Also, a rear turn signal lamp 410L and another rear turn signal lamp 410R (not shown in FIG. 1, see FIGS. 9 and 10) are attached to the tail light unit 400.

Motorcycle 10 according to this embodiment is one of the so-called American-type motorcycles, which allow a rider to take a riding position such that his or her legs are stretched out forward.

In motorcycle 10, front fender stays 22 and side garnishes 50 form straight lines extending generally parallel to the ground surface R to emphasize the image (streamline) of parallel going along the ground surface R.

Further, in the motorcycle 10, each one of the headlight unit 200, the front turn signal lamps 220 and the rear turn signal lamps 410L, 410R has a generally streamlined shape (the so-called tear drop shape) such that a front portion is large and a rear portion is small to emphasize the image (mass front forward) that a mass moves forward.

(Arrangement of Headlight Unit, Handle Bar Holder and Fuel Tank Unit)

With reference to FIGS. 2-5, an arrangement of the headlight unit 200, the handle bar holder 120 and the fuel tank unit 300 will be described.

Figure 2:
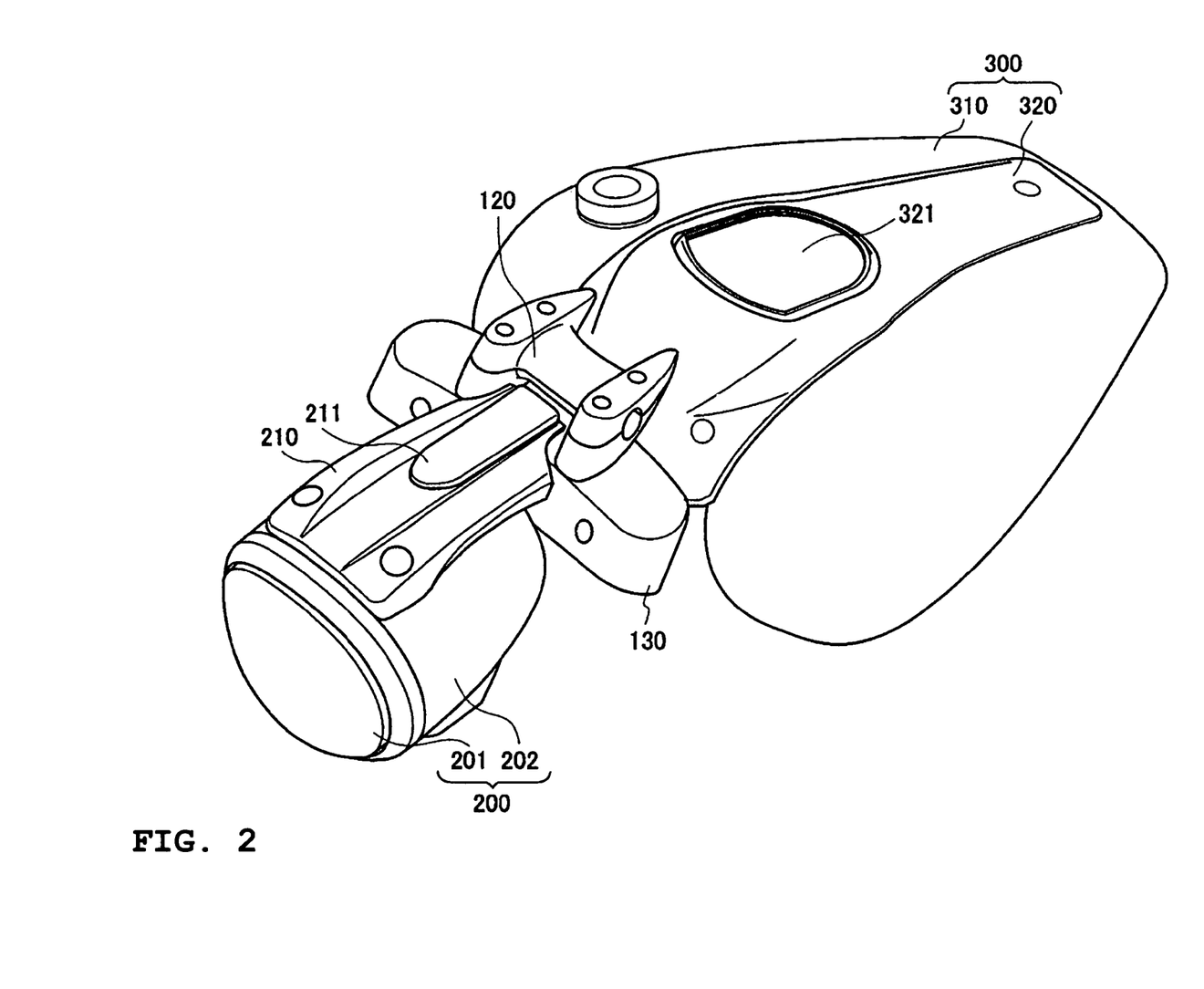
FIG. 2 is an enlarged perspective view of a headlight unit, a handle bar holder (including a handle bar crown) and a fuel tank unit according to the embodiment of this invention.

FIG. 2 is an enlarged perspective view of the headlight unit 200, the handle bar holder 120 (including the handle bar crown 130) and the fuel tank unit 300.

Figure 3:
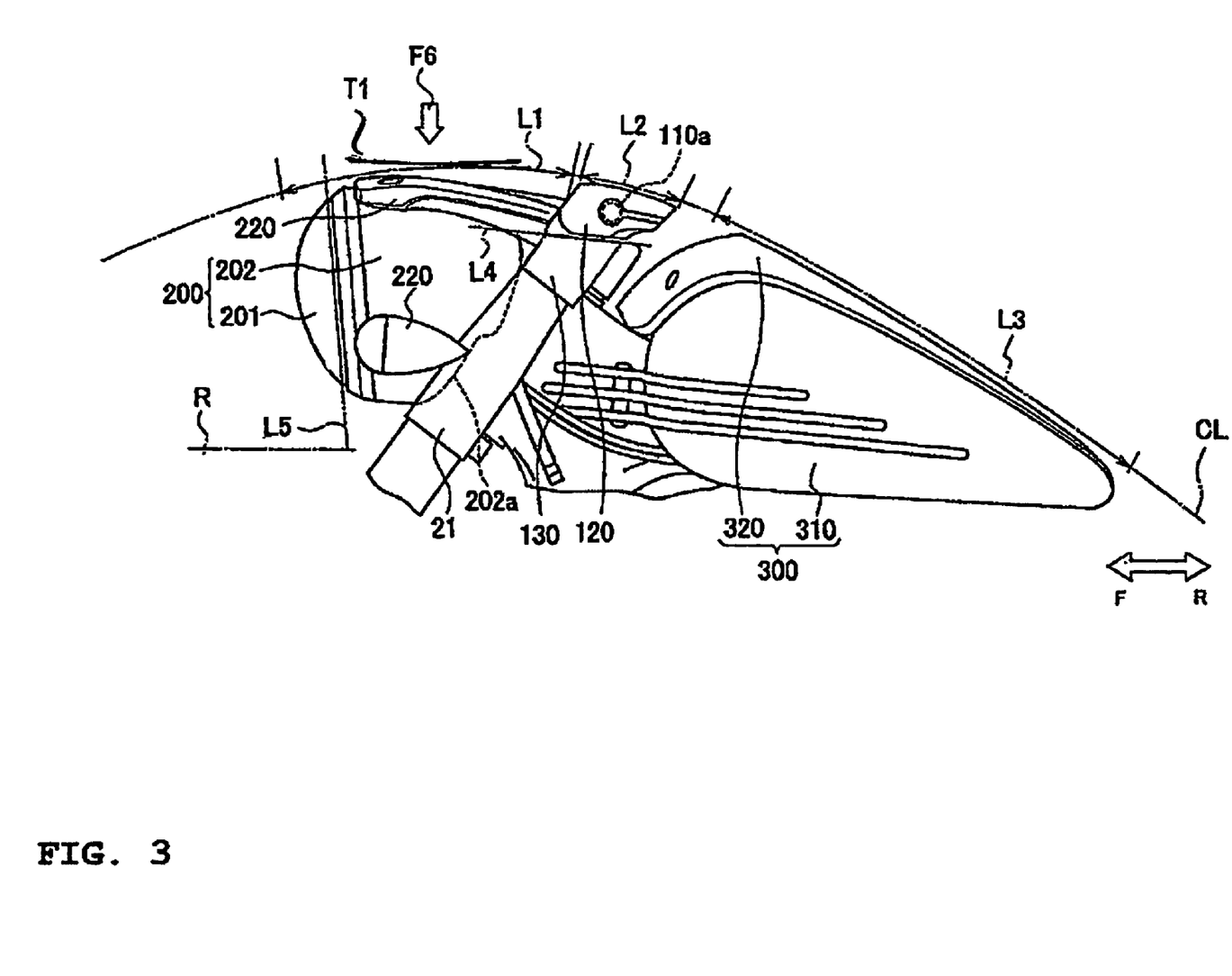
FIG. 3 is a partial, enlarged side elevational view of the headlight unit, the handle bar holder and the fuel tank unit according to the embodiment of this invention.

FIG. 3 is a partial, enlarged side elevational view of the headlight unit 200, the handle bar holder 120 and the fuel tank unit 300.

Figure 4:
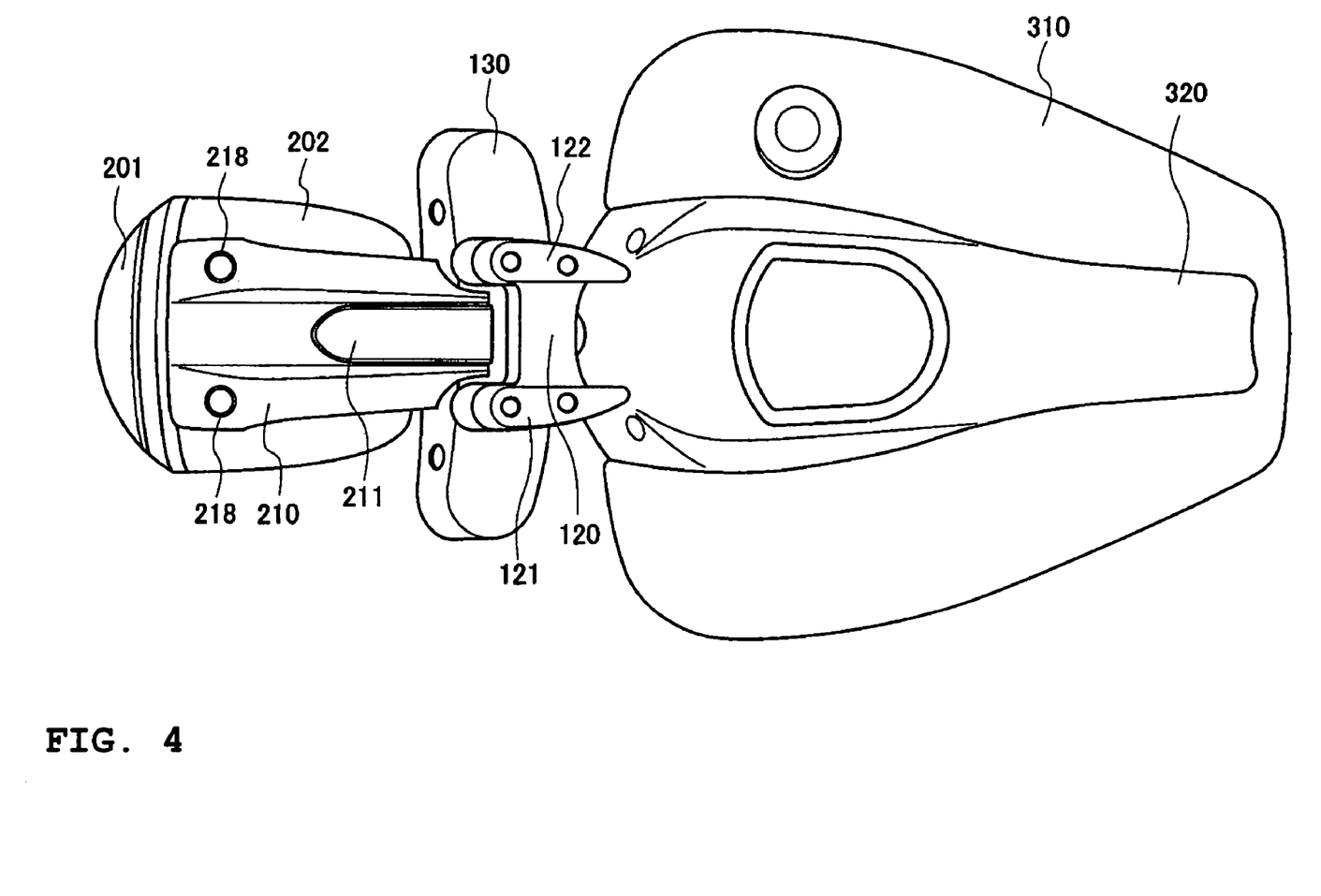
FIG. 4 is an enlarged plan view of the headlight unit, the handle bar holder (including the handle bar crown) and the fuel tank unit according to the embodiment of this invention.

FIG. 4 is an enlarged plan view of the headlight unit 200, the handle bar holder 120 (including the handle bar crown 130) and the fuel tank unit 300.

Figure 5:
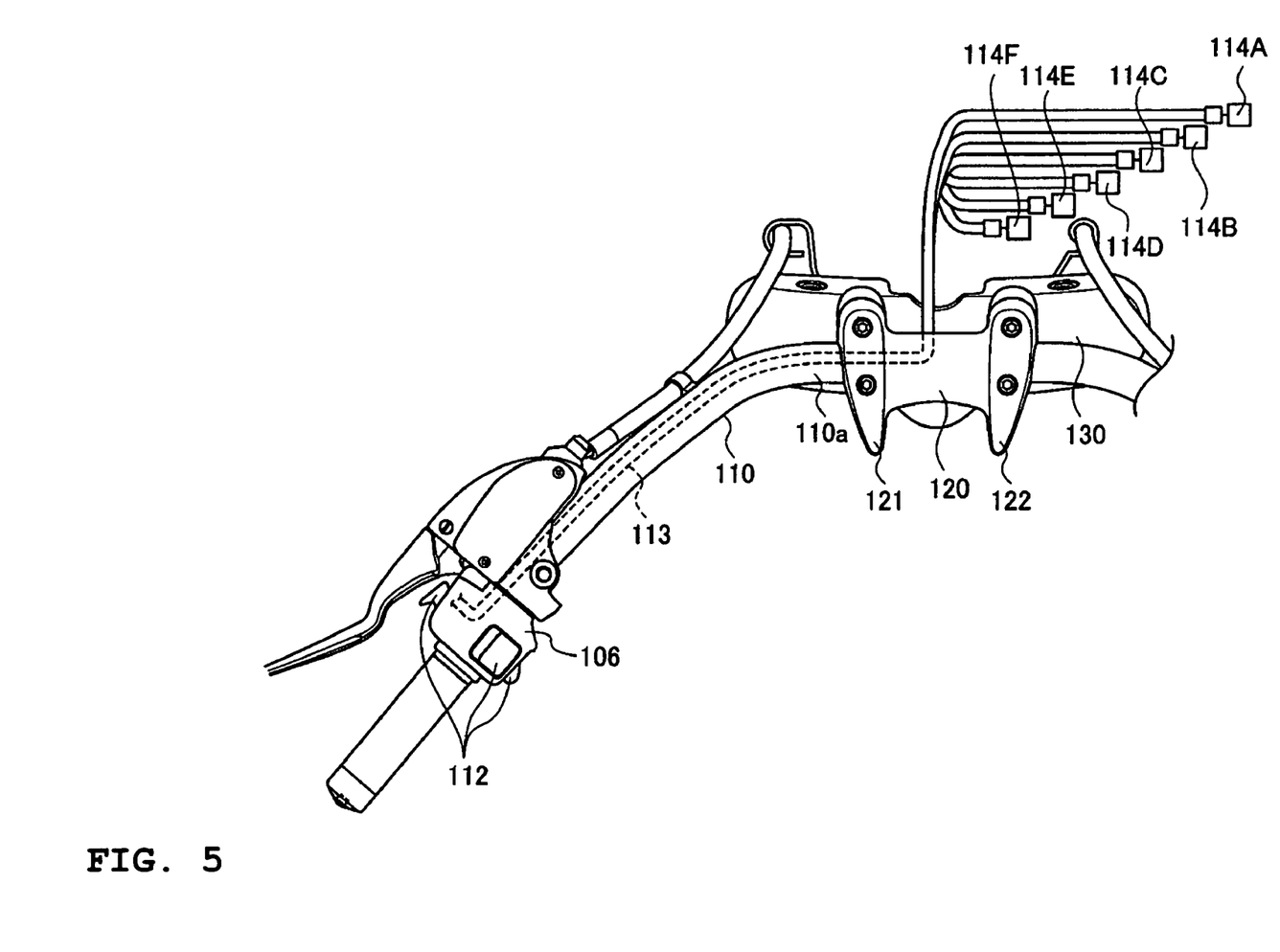
FIG. 5 is an illustration showing a handle bar held by the handle bar holder according to the embodiment of this invention.

FIG. 5 is an illustration showing the handle bar 110 held by the handle bar holder 120.

The headlight unit 200 is disposed in front of the handle bar 110 (specifically, the handle bar base portion 110a as shown in FIGS. 3 and 5).

Also, the headlight unit 200 has a lens portion 201 and a body portion 202. As shown in FIG. 3, a rear end portion 202a of the body portion 202 enters a space defined by the pair of right and left fork members of the front fork 21.

A headlight stay 210 is attached to a top surface of the headlight unit 200 to support the headlight unit 200. Specifically, the headlight stay 210 is coupled with the handle bar crown 130, and also is coupled with the headlight unit 200 by screws (not shown), which are inserted into screw holes 218 (see FIG. 4).

The headlight stay 210 has a shutter 211. A specific structure of the shutter 211 will be described below.

The fuel tank unit 300 is disposed behind the handle bar base portion 110a, and is formed with a fuel tank 310 for storing fuel supplied to the engine 30 and a meter cover 320. The meter cover 320 covers an outer circumferential portion of a meter 321 that indicates a running speed or the like of the motorcycle 10. The meter cover 320 extends from a front portion of the fuel tank 310 to a rear portion thereof.

Next, with reference to FIG. 3, the arrangement of the headlight unit 200, the handle bar holder 120 (including the handle bar crown 130) and the fuel tank unit 300 will be described.

With reference to FIG. 3, a tangent T1 to a headlight line L1 defined by the top surface of the headlight unit 200 extends generally parallel to the ground surface R (in FIG. 3, indicated by a phantom line) on which the motorcycle 10 stands, in a side view of the motorcycle 10.

Additionally, in this embodiment, the headlight line L1 is actually defined by a top surface of the headlight stay 210.

The headlight line L1 and a fuel tank line L3 defined by a top surface of the fuel tank unit 300 extend along a curved line CL (fixed curved line) in the side view of the motorcycle 10. In this regard, any curved lines (or straight lines) can be the curved line CL unless it increases air resistance generated while the motorcycle 10 runs.

Also, in this embodiment, the handle bar holder 120 is positioned between the headlight unit 200 and the fuel tank unit 300. The headlight line L1, the fuel tank line L3 and a handle bar holder line L2 defined by a top surface of the handle bar holder 120 extend along the curved line CL in the side view of the motorcycle 10.

Further, in this embodiment, the handle bar holder 120 is fixed to the handle bar crown 130. A handle bar crown line L4 defined by a top surface of the handle bar crown 130 extends generally parallel to the ground surface R in the side view of the motorcycle 10.

A border between the lens portion 201 and the body portion 202 defines a lens border line L5. In the side view of the motorcycle 10, a top portion of the lens border line L5 is inclined forward relative to the motorcycle 10.

Further, as shown in FIGS. 4 and 5, the handle bar holder 120 holds the handle bar base portion 110a, which is positioned generally at a center portion of the handle bar 110. In a plan view of the motorcycle 10, the handle bar holder 120 has generally streamlined portions 121, 122, which are portions having a streamlined shape such that a front portion is large and a rear portion is small.

As shown in FIG. 5, a grip portion 110b of the handle bar 110 has a handle bar switch 112 with which change gears of the motorcycle 10 are switched or switching modes of the change gears are set.

A wiring harness 113 is connected to the handle bar switch 112. The harness 113 extends through the interior of the handle bar 110 and is led to an external location of the handle bar 110 from the handle bar base portion 110a.

Further, terminal ends of respective cables which together form the harness 113 have connectors 114A-114F. Lengths of the respective cables, which form the harness 113, are adjusted in such a manner that the respective connectors 114A-114F are situated at different positions from each other. In addition, a tape 115, which indicates a use of each cable, is affixed to the respective connectors 114A-114F.

(Specific Structure around Headlight Unit)

Figure 6:
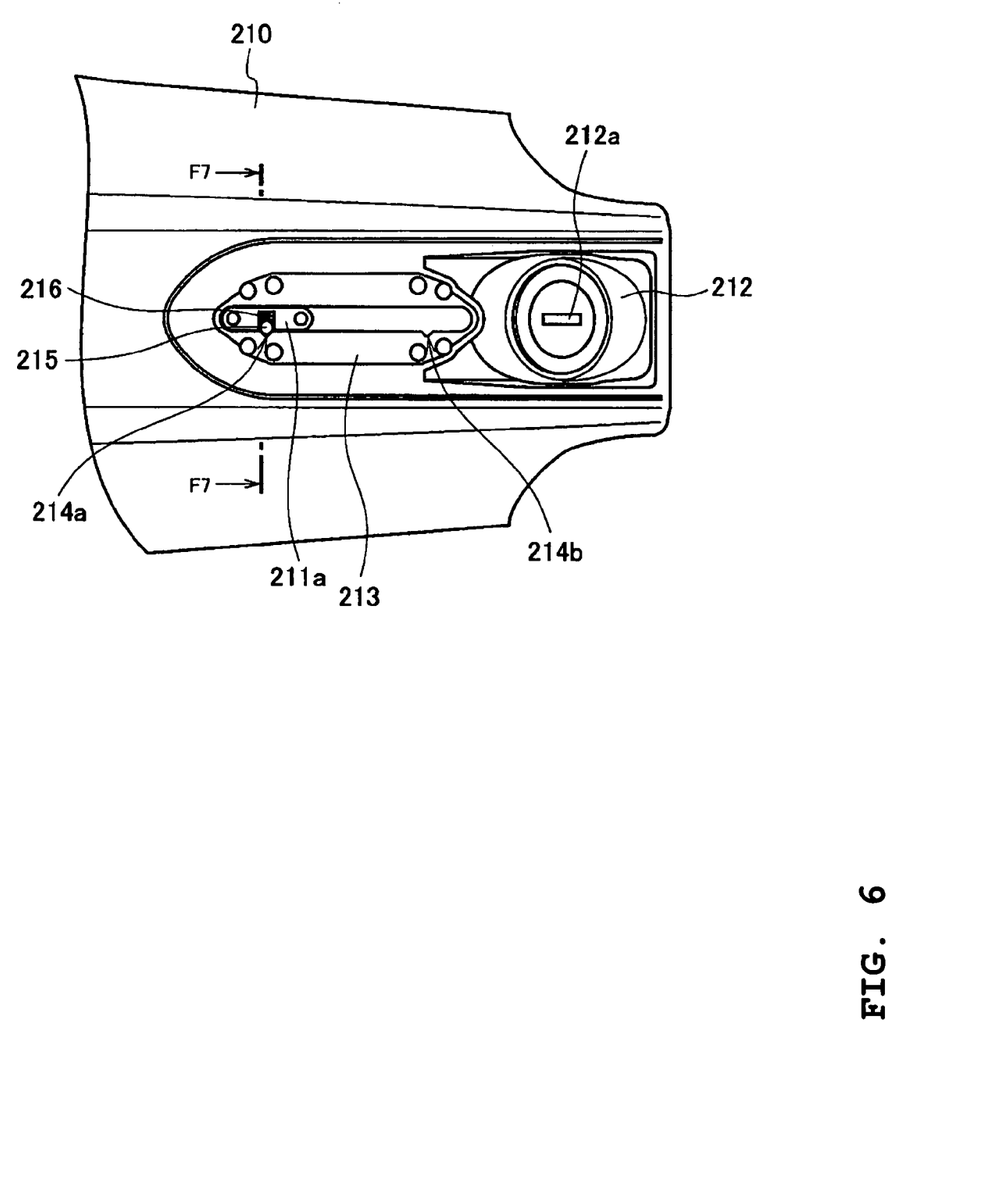
FIG. 6 is a view looked in the direction indicated by the arrow F6 of FIG. 3.
Figure 7:
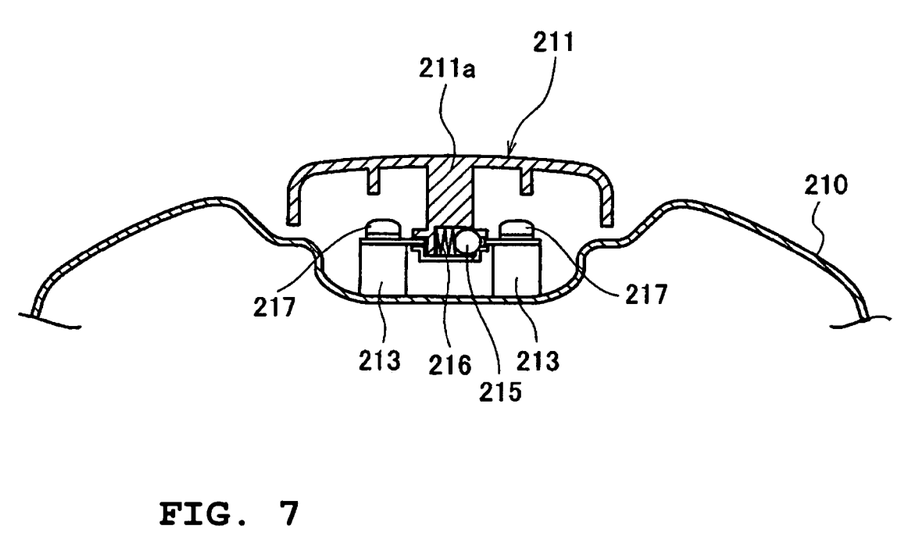
FIG. 7 is a cross sectional view taken along the line F7-F7 of FIG. 6.
Figure 8:
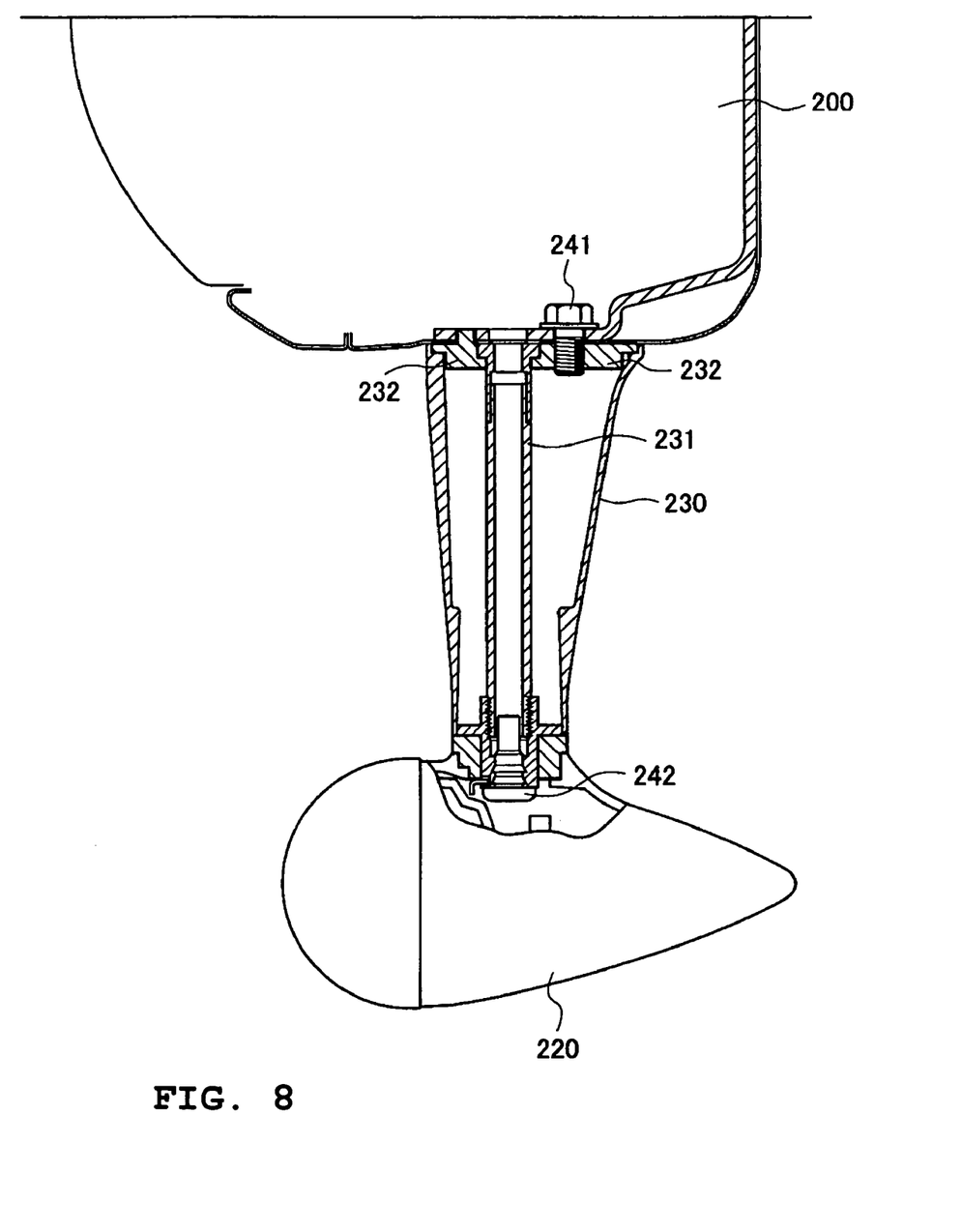
FIG. 8 is a partial plan view of the headlight unit and one of front turn signal lamps according to the embodiment of this invention.

With reference to FIGS. 6 through 8, a specific structure around the headlight unit 200 will be described below. Specifically, a structure of the headlight stay 210 that supports the headlight unit 200 and a structure of each front turn signal lamp 220 attached to the headlight unit 200 will be described.

FIG. 6 is a view looked in the direction indicated by the arrow F6 of FIG. 3, FIG. 7 is a cross sectional view taken along the line F7-F7 of FIG. 6, and FIG. 8 is a partial plan view of the headlight unit 200 and one of the front turn signal lamps 220.

(1) Structure of Headlight Stay

As shown in FIGS. 6 and 7, the top surface of the headlight stay 210 has a main switch 212 that is used to change modes between an "ON" condition under which electric power is supplied to various electric components (not shown) furnished on the motorcycle 10 and an "OFF" condition under which the electric power is shut off.

The main switch 212 has a key hole 212a (key inserted portion) into which a key (not shown) is inserted so as to be used to change the modes between the "ON" condition and the "OFF" condition, i.e., to operate the motorcycle 10.

A top portion of the main switch 212 slants forward relative to the motorcycle 10. The key hole 212a also slants forward relative to the motorcycle 10 so that the rider can easily insert the key thereinto under the condition that he or she straddles the motorcycle 10.

The top surface of the headlight stay 210 includes the shutter 211 (key covering portion) that covers the key hole 212a. The shutter 211 can cover or uncover the main switch 212 including the key hole 212a by sliding in a fore to aft direction of the motorcycle 10.

Specifically, slide rails 213 lock a shutter leg portion 211a, which is a portion of the shutter 211 for slide movement in the fore to aft direction of the motorcycle 10.

The slide rails 213 (rail portion) extend in the fore to aft direction of the motorcycle 10 and are fixed to the headlight stay 210 by a plurality of screws 217 (see FIG. 7). One of the slide rails 213 has notches 214a, 214b.

A ball 215 which rolls along the slide rail 213 and a spring 216 for urging the ball 215 against the slide rail 213 are loaded to the shutter leg portion 211a. In this embodiment, the shutter leg portion 211a, the ball 215 and the spring 216 together form a slide mechanism which is disposed at the shutter 211 (key covering portion).

While the shutter leg portion 211a (shutter 211) slides, the ball 215 rolls along the slide rails 213 together with the shutter leg portion 211a.

For example, when the ball 215 rolls from a location close to the notch 214b to reach the position of the notch 214a, the shutter leg portion 211a (shutter 211) engages with the slide rail 213 and no longer can slide further (open condition of the shutter 211).

On the other hand, when the ball 215 rolls from a location close to the notch 214a to reach the position of the notch 214b, the shutter leg portion 211a (shutter 211) engages with the slide rail 213 and no longer can slide further (closed condition of the shutter 211).

(Structure of Turn Signal Lamp)

As shown in FIG. 8, each front turn signal lamp 220 is attached to the headlight unit 200 using a turn signal lamp stay 230. One of the front turn signal lamps 220 is attached to the right side of the motorcycle 10. Because it has the same structure as the front turn signal lamp 220, the front turn signal lamp 220 will be described as the representative below.

The front turn signal lamp 220 has the generally streamlined shape (the so-called tear drop shape) such that a front portion is large and a rear portion is small in a plan view of the motorcycle 10 in addition to the side view (see FIGS. 1 and 3) of the motorcycle 10.

Each turn signal lamp stay 230 includes a shaft 231, a bracket 232 and a bracket 233.

A bolt 241 inserted from an internal location of the headlight unit 200 is screwed into the bracket 232. The bracket 232 is fixed to the headlight unit 200; thereby, the turn signal lamp stay 230 (the shaft 231) is fixed to the headlight unit 200.

A screw 242 is screwed into the bracket 233; thereby, the front turn signal lamp 220 is fixed to the turn signal lamp stay 230.

(Structure of Tail Light Unit)

With reference to FIGS. 9 and 10, a structure of the tail light unit 400 will be described. FIG. 9 is a view (plan view) looked in the direction indicated by the arrow F9 of FIG. 1, and FIG. 10 is a view (front view) looked in the direction indicated by the arrow F10 of FIG. 1.

As shown in FIGS. 9 and 10, the tail light unit 400 includes rear turn signal lamps 410L, 410R, a tail light portion 420 and turn signal lamp stays 430L, 430R.

As shown in FIG. 9, the rear turn signal lamp 410L (and 410R) has a generally streamlined shape (the so-called tear drop shape) such that a front portion is large and a rear portion is small in the plan view of the motorcycle 10 in addition to the side view (see FIG. 1) of the motorcycle 10.

Also, as shown in FIG. 10, the tail light portion 420 has a plurality of LEDs 421. Each LED 421 extends along the fore to aft direction of the motorcycle 10. That is, each LED 421 emits light rearward relative to the motorcycle 10.

On the other hand, an LED 422L positioned at a top left portion of the tail light portion 420 does not extend along the fore to aft direction of the motorcycle 10. Specifically, the LED 422L emits light in an obliquely left rear direction.

Similarly, an LED 422R positioned at a top right portion of the tail light portion 420 also does not extend along the fore to aft direction of the motorcycle 10. Specifically, the LED 422R emits light in an obliquely right rear direction of the motorcycle 10.

(Function and Effect)

According to the motorcycle 10 of this embodiment described above, the headlight line L1 defined by the top surface of the headlight unit 200 and the fuel tank line L3 defined by the top surface of the fuel tank unit 300 extend along the curved line CL that does not increase the air resistance that is generated while the motorcycle 10 runs. Thus, the wind noise caused by the air resistance while the vehicle going through the air or the influence of wind pressure on the rider can be reduced.

Further, in the motorcycle 10, because the headlight line L1, the handle bar holder line L2 defined by the top surface of the handle bar holder 120, and the fuel tank line L3 extend along the curved line CL, the wind noise or the influence of wind pressure on the rider can be further effectively reduced.

According to the motorcycle 10, the rear end portion 202a of the headlight unit 200 enters the space defined by the pair of right and left fork members of the front fork 21. Thus, wind generated by the run of the motorcycle and flowing aside of the headlight unit 200 can be guided out of the front fork 21 in the transverse direction. Thus, the wind noise or the influence of wind pressure on the rider can be further effectively reduced.

According to the motorcycle 10, because the headlight line L1 extends generally parallel to the ground surface R on which the motorcycle 10 stands, the image (streamline) of parallel going along the ground surface R, which is one of features of the motorcycle 10, can be further emphasized.

According to the motorcycle 10, because the headlight stay 210 for supporting the headlight unit 200 is attached to the top surface of the headlight unit 200, the headlight unit 200 can be securely fixed to the vehicle body frame (not shown) while defining the headlight line L1 extending along the curved line CL.

According to the motorcycle 10, because the headlight stay 210 has the shutter 211 for covering the key hole 212a (main switch 212), the key hole 212a is not easily visible from an outside location. That is, persons other than the user or the like of the motorcycle 10 cannot easily recognize the place where the main switch 212 is located. The construction thus can contribute to the prevention of the theft of the motorcycle 10.

The shutter 211 covers or uncovers the key hole 212a by sliding in the fore to aft direction of the motorcycle 10. The rider thus can easily move the shutter 211 while straddling the motorcycle 10.

According to the motorcycle 10, the handle bar crown line L4 defined by the top surface of the handle bar crown 130 extends generally parallel to the ground surface R, in the side view of the motorcycle 10. In addition, the handle bar holder 120 has the streamlined portions 121, 122 which are portions having the generally streamlined shape in the plan view of the motorcycle 10.

Further, the lens border line L5 defined by the border of the lens portion 201 and the body portion 202 of the headlight unit 200 slants forward relative to the motorcycle 10.

Thus, the image (mass front forward) that the mass moves forward, which is one of the features of the motorcycle 10, can be further emphasized while the wind noise or the influence of wind pressure on the rider being reduced.

Other Embodiments

As described above, the concept of this invention is disclosed through one embodiment of this invention. However, it should not be understood that the description and figures, which are part of this disclosure, limit the scope of this invention. Various alternative embodiments can be apparent to those of ordinary skill in the art in light of the description above.

For example, in the embodiment of this invention described above, the headlight line L1, the handle bar holder line L2 and the fuel tank line L3 extend along the curved line CL. Alternatively, the respective shapes of the headlight unit 200, the handle bar holder 120 and the fuel tank unit 300 can be changed to extend along a straight line, not the curved line CL.

Also, the handle bar crown line L4 or the lens border line L5 can take configurations other than those which are described above. Similarly, the handle bar holder line L2 can take another configuration that is different from the configuration shown in the embodiment of this invention.

Further, in the embodiment of described above, the headlight stay 210 supports the headlight unit 200. Alternatively, the headlight unit 200 can be directly fixed to the vehicle body, frame (not shown) without using the headlight stay 210.

Similarly, this invention, of course, can also include various embodiments not described herein. The scope of art as to this invention can be determined only by the invention specifying items according to claims which are suitably made from the above description.

The invention claimed is:

1. A straddle vehicle comprising:
    a handle bar for changing a direction of a wheel;
    a headlight unit disposed in front of a handle bar base portion positioned generally at a center portion of the handle bar;
    a fuel tank unit disposed behind the handle bar base portion for storing fuel supplied to an engine, the fuel tank unit having a meter cover covering an outer circumferential portion of a meter,
    wherein a headlight line defined by a top surface of the headlight unit and a fuel tank line defined by a top surface of the fuel tank unit together extend along a curved line in a side view of the straddle vehicle, a top surface of the meter cover defining a portion of the top surface of the fuel tank unit; and
    a front fork having a pair of right and left front fork members for supporting the wheel, wherein a rear end portion of the headlight unit enters a space defined between the pair of right and left front fork members in the side view of the straddle vehicle.

2. The straddle vehicle according to claim 1, wherein a tangent to the headlight line extends generally parallel to the ground surface on which the straddle vehicle stands.

3. The straddle vehicle according to claim 1, further comprising:
    a handle bar holder for holding the handle bar base portion,
    wherein a handle bar holder line is defined by a top surface of the handle bar holder, and
    wherein the headlight line, the handle bar holder line and the fuel tank line together extend along a line having a single curve in the side view of the straddle vehicle.

4. A straddle vehicle comprising:
    a handle bar for changing a direction of a wheel;
    a headlight unit disposed in front of a handle bar base portion positioned generally at a center portion of the handle bar;
    a fuel tank unit disposed behind the handle bar base portion for storing fuel supplied to an engine,
    wherein a headlight line defined by a top surface of the headlight unit and a fuel tank line defined by a top surface of the fuel tank unit together extend along a curved line in a side view of the straddle vehicle; and
    a headlight stay attached to the top surface of the headlight unit for supporting the headlight unit, wherein the headlight line is defined by a top surface of the headlight stay.

5. The straddle vehicle according to claim 4, wherein the headlight stay includes a key inserted portion to which a key used when the straddle is operated is inserted, and a key covering portion for covering the key inserted portion.

6. The straddle vehicle according to claim 5, wherein the key covering portion covers or uncovers the key inserted portion by sliding in a fore to aft direction of the straddle vehicle.

7. The straddle vehicle according to claim 6, wherein the headlight stay further includes a rail portion extending in the fore to aft direction, and wherein the key covering portion has a slide mechanism sliding along the rail portion.

8. The straddle vehicle according to claim 3, further including a handle bar crown to which the handle bar holder is fixed, wherein a handle bar crown line defined by a top surface of the handle bar crown extends generally parallel to the ground surface on which the straddle vehicle stands in the side view of the straddle vehicle.

9. The straddle vehicle according to claim 3, wherein the handle bar holder has a portion that has a generally streamlined shape in a plan view of the straddle vehicle.

10. The straddle vehicle according to claim 1, wherein the headlight unit includes a lens portion and a body portion, a border between the lens portion and the body portion defines a lens border line, and a top portion of the lens border line is inclined forward relative to the straddle vehicle in the side view of the straddle vehicle.

11. The straddle vehicle according to claim 3, wherein the line having the single curve has a C-shape.

* * * * *